Patented May 28, 1929.

1,715,213

UNITED STATES PATENT OFFICE.

JOHN SCHWAB, JR., OF WINNIPEG, MANITOBA, CANADA.

TUBE LINING.

No Drawing. Application filed January 14, 1925, Serial No. 2,415. Renewed October 6, 1928.

The invention relates particularly to linings for inner automobile and such like tubes and the method of making same and an object of the invention is to provide a tube lining which will prevent the escape of air from an inflated tube should the same become punctured, such being accomplished by utilizing a sealing composition within the tube which fills the puncture as soon as the puncturing instrument is withdrawn.

A further object is to provide a lining which will remain sufficiently plastic or mobile under all conditions, to flow into the puncture and seal it under the pressure of the air within the tube and of such a nature that it will not be displaced within the tube due to the rotary movement of the tube with the wheel.

A further object is to provide a lining which can be readily placed in a tube when the same is in course of construction and which by a simple method can be evenly distributed over the entire inner wall of the tube.

In order to render the inner tube of a pneumatic tire self healing various expediences have heretofore been adopted and in the majority of cases, the means for preventing puncture is usually exterior to the tube.

According to my invention, however, I utilize a lining which is placed within the tube and which is sufficiently plastic such that when the tube becomes punctured the lining will be forced under the pressure of the air within the tube into the puncture opening, the puncturing instrument being withdrawn.

I have done considerable experimenting to obtain a lining which will function under the somewhat difficult conditions met with and due both to the varying temperatures to which a tube in use is subjected, the tendency to shift by reason of the rotation of the wheel and the natural tendency which a more or less liquid mass has to harden after an interval of time. The lining which I have adopted comprises the following ingredients utilized in the proportions set forth. first, vulcanizing cement thirty per cent, second, melted vulcanized rubber or Pará rubber thirty per cent, third, honey forty per cent.

The vulcanizing cement and the melted vulcanized rubber or Pará rubber are first mixed and subsequently the honey is added. The mixture is then heated to approximately 260 degrees F. After the so heated mixture has cooled somewhat, it is put into the inner tube prior to splicing the tube, a sufficient amount of the mixture being used to fully coat the inner wall of the tube. The mixture having been put in the tube, one then splices the ends of the tube together in the ordinary way. The tube is not inflated until one has rolled it to initially distribute the mixture over the inner wall of the tube. After this is done one inflates the tube in the usual manner and then rolls it again against the pressure of the air within the tube.

When air is blown into the tube subsequent to the aforementioned rolling operation the more or less sticky mixture will pull apart and will adhere to the inner wall of the tube. When the tube is inflated, the second rolling is given against the pressure of the air in the tube. This second rolling gives an even distribution of the self healing lining over the entire inner wall of the tube.

It is best not to use the tube for say twenty four hours. In this time, it will be found that there is formed a surface layer of plastic material and an inner skin which is not so plastic and which has sufficient rigidity to hold the plastic material in place and maintain it evenly distributed over the entire inner face of the tube when the same is in use. This skin which forms, due to the direct exposure to the internal air, is very important, as otherwise the lining would shift under road conditions. It further protects the inner or more plastic material from being subjected to the action of the air and consequently the surface layer remains at all times plastic. I might remark that the amount of sulphur retained in the mixture is what causes the hardening of the aforesaid inner skin and obviously the amount which it hardens so to speak can be determined by the amount of sulphur introduced. It is here explained also that the vulcanizing cement which I use and which is now a commercial commodity contains sulphur.

A lining of this nature in a tube will effectively prevent any escape of air from the tube due to punctures as obviously as soon as the puncturing instrument is withdrawn the plastic surface layer will be forced into the puncture opening to seal it, this occurring under the pressure of the air within the tube.

This lining can also be placed in tubes already spliced. In such a case, it is only necessary to remove the customary air valve, and force the mixture into the tube through the valve stem. This can be done by utilizing a force pump of any approved type. After sufficient of the mixture has been put into the tube, it is rolled in the same manner as hereinbefore described.

What I claim as my invention is:—

A self healing composition for an inflatable automobile or such like tube comprising a mixture embodying vulcanizing cement 30 per cent, melted vulcanized rubber 30 percent and honey 40 percent, the vulcanizing cement and the melted vulcanized rubber being first mixed and the honey subsequently added and then the entire mixture heated to a temperature of approximately 260 degrees F.

Signed at Winnipeg this 15 day of December, 1924.

JOHN SCHWAB, Junior.